March 3, 1953  F. D. MILES  2,630,010
LIQUID METER
Filed April 2, 1946  6 Sheets-Sheet 1

Inventor
FRANK DOUGLAS MILES
By Harold A. Jewett
Attorney

March 3, 1953  F. D. MILES  2,630,010
LIQUID METER
Filed April 2, 1946  6 Sheets-Sheet 2

Inventor
FRANK DOUGLAS MILES
By Harold A. Jewett
Attorney

March 3, 1953 — F. D. MILES — 2,630,010
LIQUID METER
Filed April 2, 1946 — 6 Sheets-Sheet 4

Inventor
FRANK DOUGLAS MILES
By Harold A. Jewett
Attorney

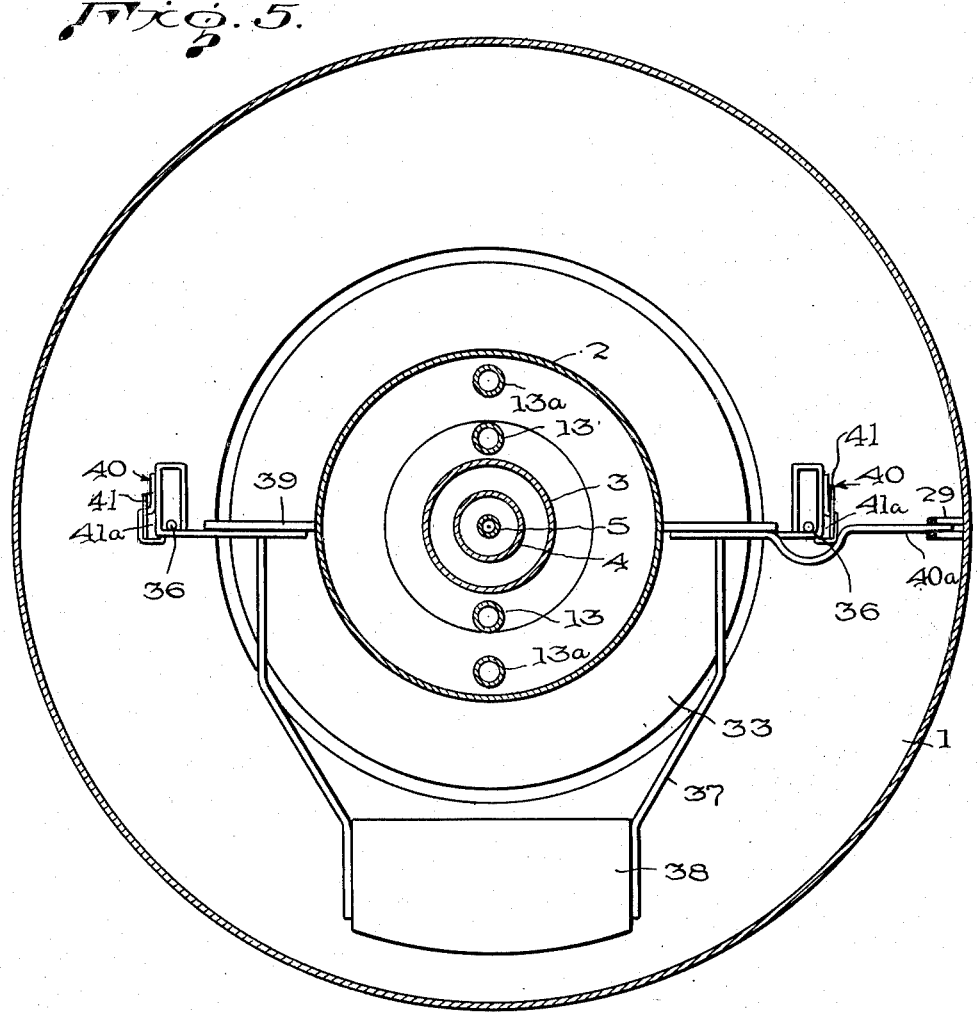

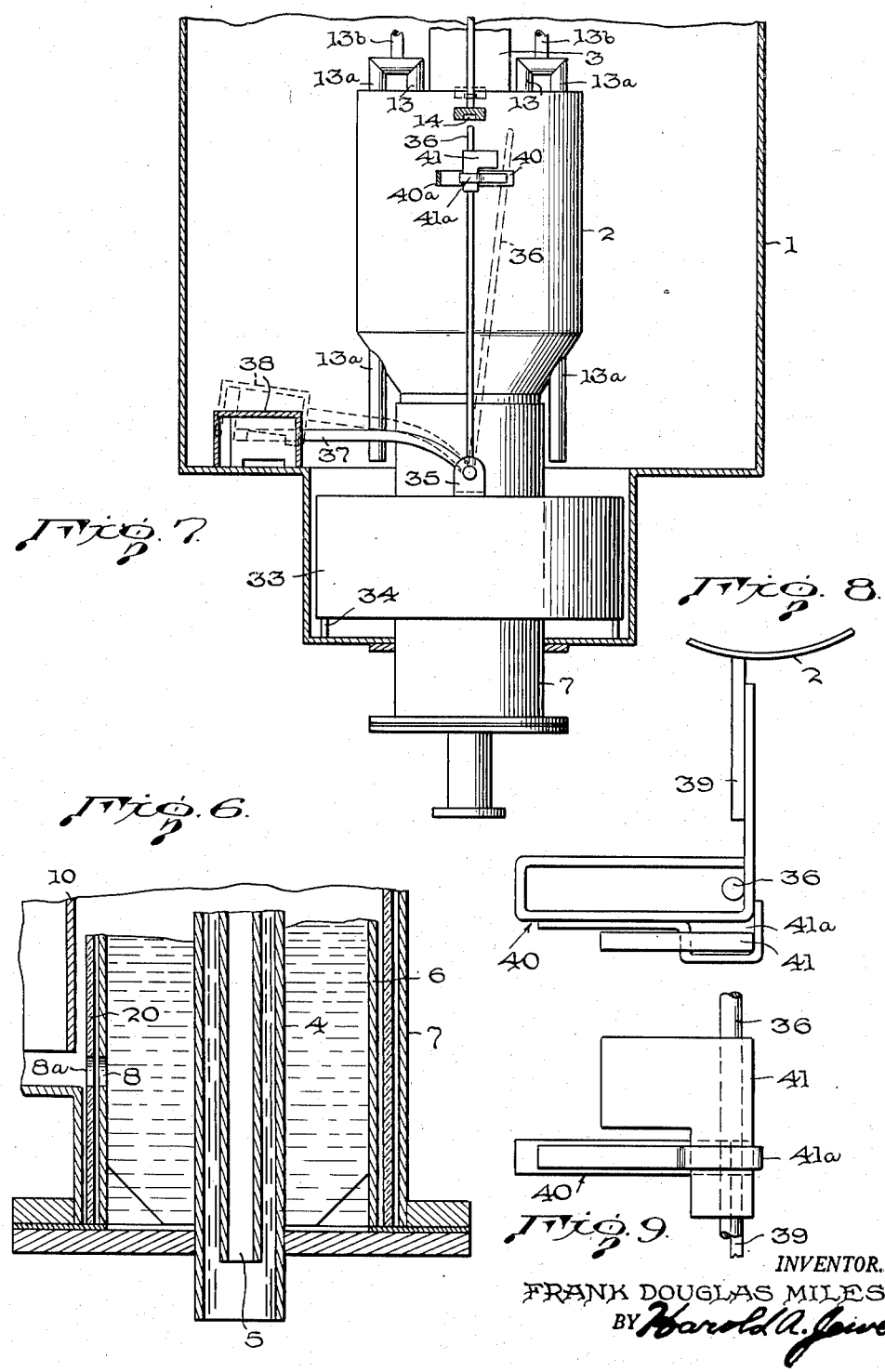

Patented Mar. 3, 1953

2,630,010

UNITED STATES PATENT OFFICE 2,630,010

LIQUID METER

Frank Douglas Miles, West Kilbride, Scotland, assignor to Imperial Chemical Industries Limited, a corporation of Great Britain Application April 2, 1946, Serial No. 658,926
In Great Britain April 18, 1945

8 Claims. (Cl. 73—226)

The present invention has for its object to provide an automatic siphon apparatus adapted to receive a continuous flow of liquid and to deliver it by gravitation in successive siphon discharges, each approximating nearly to the same volume irrespective of variations in the rate at which the liquid flows into the apparatus, whereby a count of the number of discharges in a given period will enable an accurate estimate to be made of the amount of liquid delivered by the apparatus in that period. The apparatus finds application for estimating the liquid delivery to and from production plants, for calibrating vessels and the like.

The variation in the successive volumes delivered by the apparatus provided by the present invention will not usually exceed about 0.5 per cent. The apparatus may also be made completely automatic in its action by provision of an automatic recording counter. It requires no power additional to what may be required to cause the liquid to flow into it, and can readily be made of materials resistant to corrosion by the particular liquid it is intended to measure, and its continued accuracy is facilitated by the fact that it has no rotating parts.

Broadly the invention comprises a main tank to which entry for the liquid is afforded through inlet valves from a receiver tank and in which there reciprocates vertically about a standing exit delivery pipe a floatable and sinkable bell siphon tube structure having an associated float trough and trough draining siphons, the inlet valves being adapted to close whenever this structure starts to sink from its floating position and the bell siphon being forced to start emptying the main tank when said structure reaches its sunken position, the inlet valves remaining closed until the liquid from the main tank, including the liquid drained into the latter out of the float trough, has been emptied and the bell siphon breaks, whereupon means, actuated by an independent float raised by the liquid falling back when the bell siphon breaks, opens at least one of the inlet valves.

The apparatus more particularly comprises a receiver tank having self-closing valves which open to allow the liquid to run gravitationally into a main tank that is emptied by an intermittently acting bell siphon structure reciprocating vertically between a fixed upper position and a sunken position in which its crown is slightly above the minimum liquid level in said tank, around a fixed standing exit delivery pipe, said bell siphon structure having attached to it a float trough, which, when filled up by liquid from the main tank filled to a predetermined level, rapidly sinks the structure and causes the bell siphon to empty the main tank, and which, when emptied, slowly floats the structure as the main tank fills up again, and also attached to it at least one intermittent float emptying siphon adapted to transfer the liquid in the trough to the contents of the main tank still being siphoned out by the bell siphon; there being provided also inlet valve control means, actuated first by the raising of separate float means by the liquid running back when the bell siphon breaks, and later by the rising of the bell siphon tube structure, for opening the valves and maintaining them open until the submersion of the float trough allows them to close, and permitting them to remain closed thereafter until the main tank has been emptied and the bell siphon has been broken.

According to one feature of the invention the lower portion of the bell siphon tube structure is ported and is of greater diameter than the upper portion, and a guide chamber in which it can freely slide upwards and downwards is defined by a cup or sleeve rising upwards through the main tank, through the base of which the standing tube passes, the wall of the cup or sleeve being ported close to the base of the main tank to provide an effective passage for the liquid through the ports between the main tank and the interior of the siphon bell tube structure when the latter is in its fully sunken position, and only when it is in that position. According to another feature of the invention the float means adapted to be raised by the liquid running back when the bell siphon breaks comprises a float positioned at the base of the main tank and confined so as to develop a tendency to tilt as it rises, and the inlet valve control means, at least one push rod associated with said float and in a position such that when this float begins to rise from its unfloated position it will engage and raise a co-operating member that is attached to an inlet valve and is capable on continued rise of said float of holding said push rod in engagement therewith against the tilting force, so as to open and maintain open said valve, until, as a result of the subsequent further motion of said valve by additional inlet valve control means attached to the rising bell siphon tube structure, said push rod is released and consequently tilted out of position for re-engagement until the main tank is again empty and the float returns to its unfloated position. Preferably the valves are in the base of the receiver tank.

According to a further feature of the invention the float emptying siphon has branching from its crown a bent air outlet pipe; a portion of which is freely slidable through the standing delivery exit pipe and extends to a short distance from the lower end thereof when the bell siphon tube structure is in its fully sunken position whereby said float emptying siphon is adapted to fill itself when the crown is submerged in the liquid, but does not break the bell siphon when it has itself broken.

According to a preferred feature of the invention the upper portion of the main tank beyond the base of the receiver tank is constricted, so that it leaves only a small space around the uppermost portion of the float trough, a stop for the floating bell siphon structure being provided at such a position that the uppermost portion of the float trough can just enter the constricted upper portion of the main tank.

The invention will be further described with reference to the diagrammatic drawings accompanying the specification in which one form of apparatus in accordance with the invention is seen in vertical axial section in two planes perpendicular to one another in Figures 1 and 2, and another form of apparatus in accordance with the invention is similarly represented in Figures 3 and 4. In each case the apparatus is represented at the moment when the main tank has been emptied by the bell siphon discharge and the bell siphon is about to break. Figure 5 is a partly sectioned plan on AA in Figure 3.

Fig. 6 is a sectional detail of the vertical wall members at the base of the apparatus when the bell siphon is in sunken position.

Figs. 7–9 are details of portions of the embodiment of the invention shown in Figs. 3–5.

Figure 1:
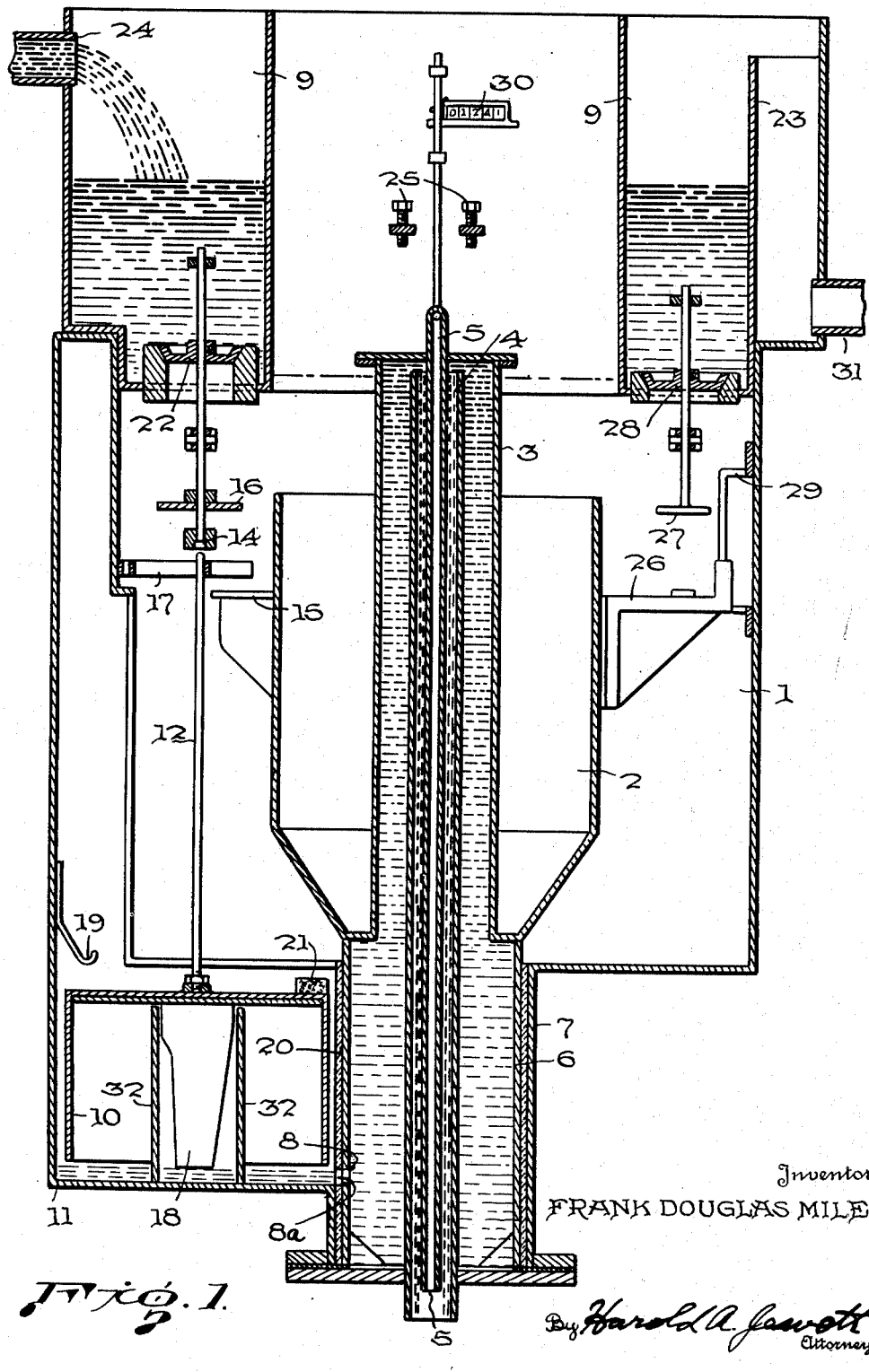
Figure 2:
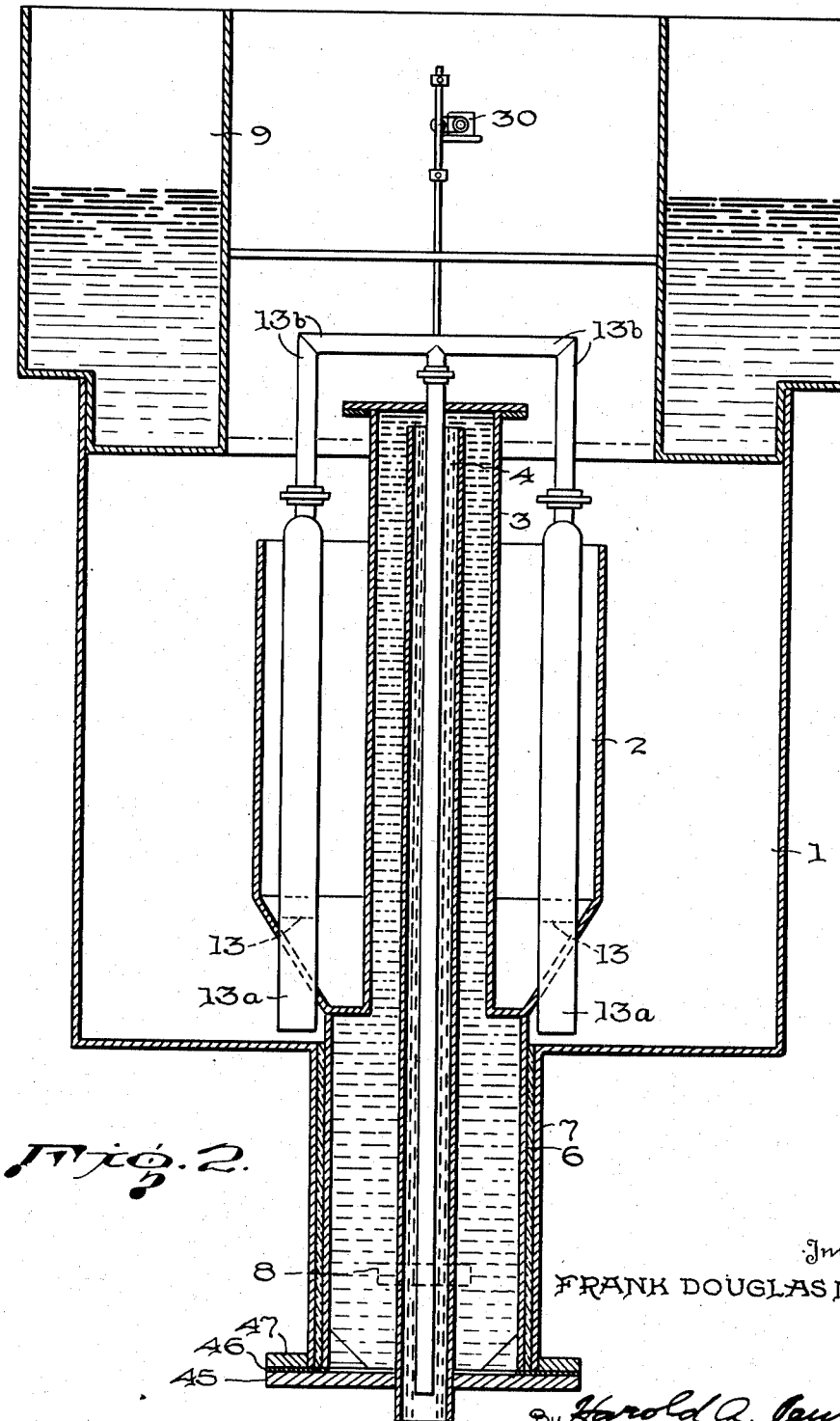

Referring to Figures 1 and 2, it will be seen that the valves 22 and 28 are closed; and during the whole of the period while the liquid has been passing out of the lower portion of the main tank 1 through the port 8 in the wall 6 of the lower and wider portion of the bell siphon structure 3 into the latter and down the standing delivery pipe 4, these valves have remained shut while the liquid has been pouring into the receiver tank 9. Whenever the siphon breaks the liquid falls back from the top of the bell siphon structure 3, and passes through the passage formed by the ports 8 and 8a into the lower portion of the main tank 1, and causes the float 10 to rise from the supporting and guiding members 32 attached to the base wall 11 of the lower portion of the main tank 1. As the float rises it is tilted by the weight 21 so that the top of the push rod 12 attached to it tends to be inclined inwards towards the bell siphon structure 3. The lower portion of the main tank forming the float chamber is non-circular, and the float 10 is also non-circular. The float is guided by a fin 13 which cooperates with the members 32, to limit its motion toward and away from the bell structure while permitting it to tilt inwards or outwards as it rises and falls. The inward inclination of the top of the push rod 12 is limited by the slot member 17, and the top of the rod enters a recess in the terminal cup 14 of the dependent stem of the upper inlet valve 22 from the receiver tank 9, into which the liquid is running from the inlet pipe 24. The resulting opening of the self-closing valve 22 thus enables the water contained in the receiver tank 9 to start filling the main tank 1. As the float 10 continues to rise it comes up against a stop 19, which tends to tilt the float so as to move the top of the push rod away from the bell structure, but the motion of the top of the push rod in that direction is prevented so long as it is held in the cup 14. As the water fills into the main tank the float trough 2 forming part of the bell siphon structure begins to raise the bell siphon structure upwards, thus closing off the communication through port 8a in the cylindrical wall 20 close to the base of the lower portion of the main tank 1 and the port 8 in the cylindrical wall of the lower portion of the bell siphon structure, which is of greater circumference than the wall from the base of the float trough 2 upwards. The wall 6 is a sliding fit within the wall 20. A lifting bracket 26 attached to the float trough 2 rising between guides 29, which prevent the bell siphon structure from rotating, comes up against the terminal disc 27 of the dependent stem of a second and lower self-closing valve 28 from the receiver tank 9 and starts to open it, and at the same time another lifting bracket 15 attached to the float trough 2 comes up against a disc 16 on the dependent stem of the self-closing valve 22 and continues to raise this valve from its seating, so that the cup 14 releases the end of the push rod 12, which now tilts to the left as seen in the drawing away from the bell siphon structure 3 clear of the cup 14 and as far as the slot member 17 will permit. The bell siphon structure 3 continues to move upwards until it is stopped by the stop members 25, which are so positioned as to hold the top of the float trough 2 just inside the constricted portion of the main tank 1 formed by the inner wall of the receiver tank 9, which is of only slightly greater diameter than the float trough 2.

The liquid continues to rise in the main tank until it reaches a level just above the top of the float trough 2 and just below the top of the standing delivery pipe 4, as shown by the broken line in the narrower portion of the main tank in Figures 1 and 2. At this stage the liquid in the receiver tank 9 is at so low a level that it is only through the valve 28 that the liquid is entering the main tank. The liquid has leaked in between the walls 6 and 20, and the level of the liquid within the upper part of the bell siphon structure 3 is the same as the level outside it.

Fig. 6 is shown, in exaggerated degree, the spacing of wall members 6, 20, and 7, with ports 8 and 8a, when the bell is in its lowest position, whereby the hereinabove described coaction of these parts is effectuated.

The liquid now begins to spill over the top of the float trough 2, and when sufficient liquid has entered the float trough to sink the top of it into the wider portion of the main tank 1, the rate at which the liquid enters the float trough 2 is greatly increased so that the bell siphon structure is rapidly plunged to its fully sunken position. The self-closing valves 22 and 28 therefore drop quickly into their seatings and prevent the entry of any substantial quantity of liquid into the main tank during the period while the float trough 2 is being filled.

The forcible submergence of the bell siphon structure 3 forces the liquid between its inner wall and the standing delivery pipe 4 upwards, to the top of the bell and into the standing delivery pipe 4, thus establishing the bell siphon from the main tank through the now effective port 8.

The submergence of the bell siphon structure 3 also causes the two balanced float-emptying siphons carried by it, best seen in Figure 2, to become ready to function, by forcing the liquid in the shorter limbs 13 and the longer limbs 13a far up into the connecting branch pipe 13b displacing the air into the descending air outlet pipe 5, which is attached to the bell siphon structure 3 and can slide up and down the standing delivery pipe 4. As will be seen, when the bell siphon structure is in its lowest position the lower end of the pipe 5 is a short distance above the end of the pipe 4. The liquid descending in the latter seals the end of the pipe 5. Whenever the liquid level in the main tank 1 falls below that in the float trough 2 the float emptying siphons begin to empty the latter. The capacity of these float-emptying siphons is sufficient to ensure that they will both break before the bell siphon breaks.

As the liquid in the lower portion of the main tank 1 descends, the float 10 falls; and as it does so the weight 21 causes the push rod 12 to tilt back towards the bell siphon structure until it is stopped by the slot member 17 in a position such that the push rod will re-engage the cup 14 when the cycle begins again.

Each time the bell siphon structure rises to the top, it actuates a counter 30.

The constant level device 23 and the runaway outlet 31 are intended as a safeguard against the possibility of flooding and are not intended to function in the normal running of the apparatus.

Figure 3:
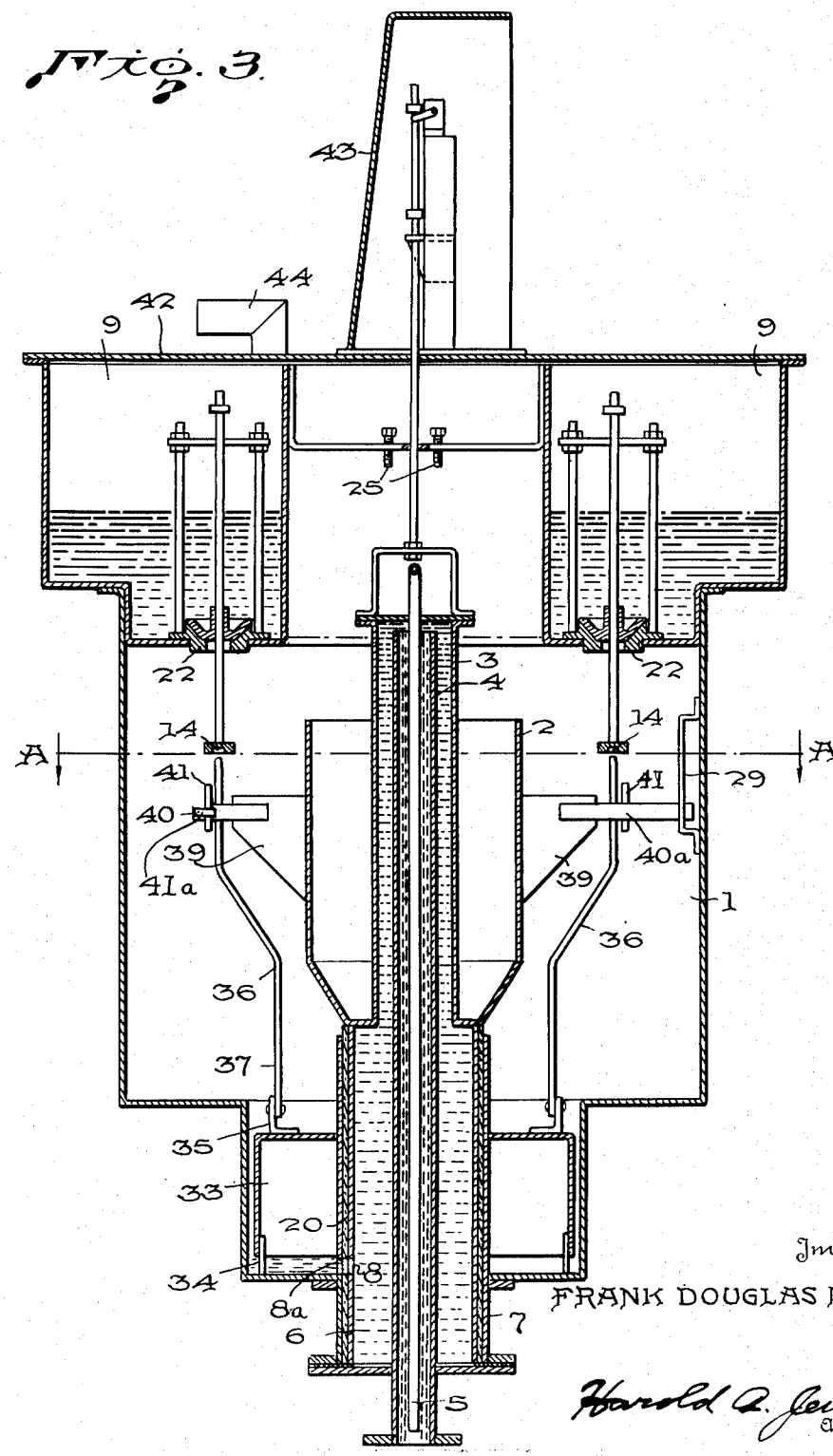
Figure 4:
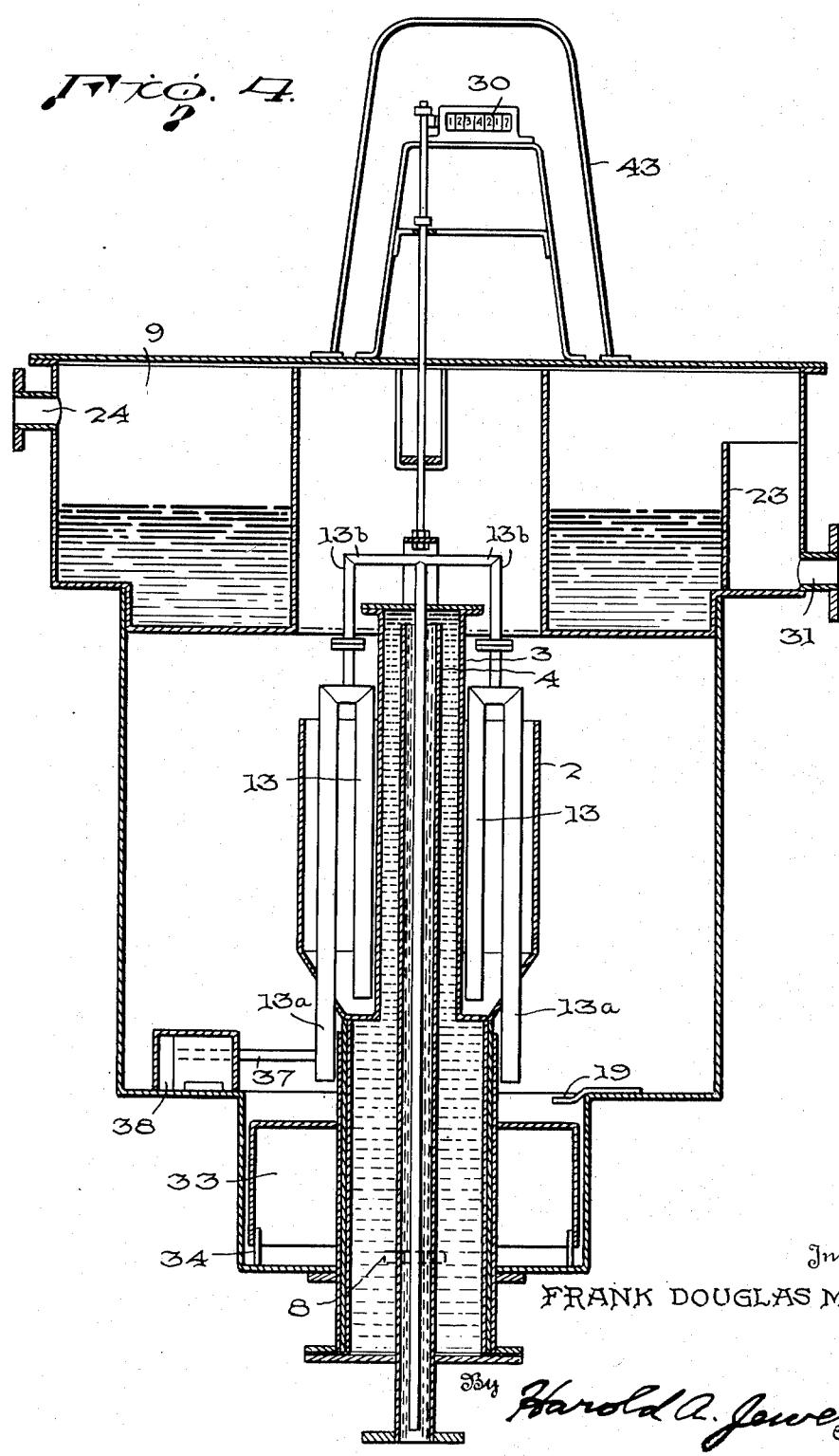

Referring to Figures 3, 4 and 5, where they occur the numerals 1 to 9 have the same significance as in Figures 1 and 2. As is best seen in Figure 3, the valves 22 are at equal heights, and the terminal cups 14 of the valve stems, which are also at equal heights, are both entered at the same time by the push rods 36 so that the two valves 22 are opened simultaneously. The lowest portion of the tank 1 forms an annular chamber round the lower portion of the bell siphon structure 3; and in this chamber there is accommodated an annular float bell 33 to which the push rods 36 are swingably connected through the brackets 35, to which they are pivoted. As best seen in Figure 5, 37 are tie rods rigidly connected to the push rods 36, and 38 is a float, which is also seen in Figure 4. 34 seen in Figures 3 and 4, are extension pins on the walls of the float bell 33, and 19 is a stop for the bell float 33. As indicated in particular in Figure 7, bell float 33 is guided in its upward and downward movement by the wall 7. The numerals 13, 13a and 13b have the same significance as in Figure 2.

Referring to Figures 3 and 5, 39 are brackets attached to the float trough 2 and 40 are doubly slotted guide members attached to the brackets 39, through one slot of each of which the push rods 36 protrude. The other slot of each member, denoted by the numeral 41a (cf. Figs. 5, 8 and 9) supports a lifting pin 41 (cf. Figs. 3, 5 and 7-9), the narrow part of which forms a sliding fit in it. 29, as seen in Figures 3 and 5, is a slotted guide member in which member 40a attached to one of the brackets 39 can slide up and down. The rotational movement of the bell siphon structure as a whole is prevented by the slotted members 29, while the tilting of the push rods 36 by the float 38 is limited by the slotted member 40.

In Figure 4 the numerals 23, 24, 30 and 31 have the same significance as in Figure 1. 42 is a lid for the receiver tank 9, as is best seen in Figure 3, and 44 is a vent. 43 is a cover enclosing the revolution counter 30.

As will readily be seen from the drawings and the foregoing description, the working of the apparatus illustrated in Figures 3, 4, 5 and 7-9 is closely similar to that of the apparatus shown in Figures 1 and 2, the main difference lying in the fact that the float raising the push rods is an annular structure concentric with the lower portion of the bell siphon structure, which simplifies the construction and enables both inlet valves to be opened simultaneously by push rods while minimising any tendency for the siphon bell structure to tilt as it rises when the valve opening movement commences. The manner in which the push rods are brought back to their original positions as the bell siphon structure sinks and the manner in which they are deflected away from cups on the valve stems when the bell siphon structure has risen sufficiently to release them from these cups is also different, these operations being accomplished by means of an unbalanced float which by its rise or fall varies the angle made by the push rods with the vertical without tilting the float structure, to which the push rods are attached by a swivel joint.

The structure and mode of action here referred to are more particularly, though diagrammatically, depicted in Fig. 7, wherein the relative positions of float 38 and push rods 36 at the moment of the lowest position of the former are indicated in solid lines, while their corresponding relative positions, after raising of the float 38 by liquid passing through ports 8 and 8a due to breaking of the bell siphon, are indicated in dotted lines. When lifting pins 41 raise terminal cups 14, rods 36 are thereby released so as to be tilted by the action of float 38 to their dotted line position, thus clearing the way for the valves 22 (whose stems terminate in said cups) to close completely on emptying of the receiver tank 9, and thus be ready for the start of a new cycle.

I claim:

1. A liquid meter adapted to receive a continuous flow of liquid and to deliver it by gravitation in successive discharges comprising a main tank, a receiver tank, an inlet valve for controlling the flow of a liquid from said receiver tank to said main tank, a discharge delivery pipe positioned substantially vertically within said main tank having the entrance end thereof a substantial distance above the bottom level of said main tank, a bell tube structure including a float trough connected therewith and comprising a tube closed at its upper end surrounding said delivery pipe, a guide chamber comprising a sleeve extending upwardly from the base of said main tank and surrounding a portion of the length of said tube closed at its upper end and permitting the bell tube structure to slide freely upwardly and downwardly, the wall of said sleeve being ported close to the base of said main tank to provide an effective passage for the liquid from the interior of the bell tube structure into the main tank when the former is in a position approaching its lowest level and only when in said position, said bell tube structure being adapted by means of the connected float trough to rise to a predetermined position in response to a rising liquid level in said main tank and to sink when said liquid level in said main tank overflows into said float trough whereby when said bell structure attains a position approaching its lowest level a syphon is formed and liquid flows from said main tank through said ported passage into said bell tube structure and out through the delivery pipe, an independent float within said main tank having means for opening said inlet valve, said valve remaining closed during the discharge of said main tank by said syphon action, and said valve opening to permit liquid to enter the main tank from the receiver tank in response to a break in the said syphon action occasioned by a sufficient discharge of the said main tank and said float trough, said break in said syphon permitting the liquid in the bell tube structure to fall back through said ported communication passage and raise the independent float and thereby open said valve, and a syphon drain connecting said float trough and said main tank at a level so as to permit flow of liquid from said float trough to said main tank when said bell tube structure attains a position approaching its lower level and the liquid level of said main tank is below the liquid level of said float trough.

2. A liquid meter adapted to receive a continuous flow of liquid and to deliver it by gravitation in successive discharges as set forth in claim 1 wherein the lower portion of the tube closed at its upper end and surrounded by said guide chamber sleeve is of greater diameter than the upper portion of said tube.

3. A liquid meter adapted to receive a continuous flow of liquid and to deliver it by gravitation in successive discharges as set forth in claim 1 wherein the independent float means adapted to be raised by the liquid falling back through said ported passage upon a break in said syphon action comprises a float positioned at the base of the main tank and confined therein so as to develop a tendency to tilt as it rises, a cup connected to said inlet valve, a push rod carried by said float in a position such that when said float begins to raise it will engage said cup and open said inlet valve, said cup engaging said push rod on continued rise of said float to hold said valve open despite said tilting force, an inlet valve control means carried by said bell tube structure, said inlet valve control means independently lifting said cup to thereby release said push rod which tilts out of contact with said cup.

4. A liquid meter adapted to receive a continuous flow of liquid and to deliver it by gravitation in successive discharges as set forth in claim 1 wherein said syphon drain connecting said float trough and said main tank includes an air outlet pipe communicating therewith at substantially the highest level of said syphon drain and extending downwardly through said discharge delivery pipe, terminating at a point above the end of said discharge pipe.

5. A liquid meter adapted to receive a continuous flow of liquid and to deliver it by gravitation in successive discharges as set forth in claim 1 wherein the upper portion of said main tank extends to a level above the lower liquid level of said receiver tank, said upper portion of said main tank being located directly above the bell tube structure and having a cross sectional shape just permitting said bell tube structure including said float trough to rise therein, and a stop for the bell tube structure for limiting the entry of said float trough into said upper portion of said main tank.

6. A liquid meter adapted to receive a continuous flow of liquid and to deliver it by gravitation in successive discharges as set forth in claim 1 wherein a counter is operably connected with said bell tube structure for determining the number of successive discharges of said main tank.

7. A liquid meter adapted to receive a continuous flow of liquid and to deliver it by gravitation in successive discharges as set forth in claim 1 wherein at least two inlet valves for controlling the flow of the liquid from said receiver tank to said main tank are provided, said independent float within said main tank having means for opening said inlet valves upon a break in said syphon action causing liquid in said bell tube structure to fall back through said ported communication passage and raise said independent float, and means for maintaining said valves in their opened position connected to said bell tube structure which means become operative upon the rise of said bell tube structure in response to the floating action of said trough upon attaining a predetermined height.

8. A liquid meter adapted to receive a continuous flow of liquid and to deliver it by gravitation in successive discharges as set forth in claim 7 wherein a second independent float connected to said first independent float operated means for holding the valves open applies a tilting force to said first independent float operated means when a predetermined liquid level is reached in said main tank to render said first independent float operated means ineffective for maintaining said valves in said open position upon the action of said means connected to said bell tube structure for maintaining said valves open.

FRANK DOUGLAS MILES.

REFERENCES CITED

The following references are of record in the file of this patent:

UNITED STATES PATENTS

| Number | Name | Date |
| --- | --- | --- |
| 1,901,785 | Swindin | Mar. 14, 1933 |

FOREIGN PATENTS

| Number | Country | Date |
| --- | --- | --- |
| 158,201 | Germany | Feb. 6, 1905 |
| 289,384 | Germany | Dec. 21, 1915 |